US012603806B2

(12) United States Patent
Tawa et al.

(10) Patent No.: US 12,603,806 B2
(45) Date of Patent: Apr. 14, 2026

(54) COMMUNICATION CONTROL APPARATUS, COMMUNICATION SYSTEM, AND METHOD

(71) Applicant: NEC Corporation, Tokyo (JP)

(72) Inventors: Noriaki Tawa, Tokyo (JP); Tomoya Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 11 days.

(21) Appl. No.: 18/845,052

(22) PCT Filed: Mar. 23, 2022

(86) PCT No.: PCT/JP2022/013724
§ 371 (c)(1),
(2) Date: Sep. 9, 2024

(87) PCT Pub. No.: WO2023/181216
PCT Pub. Date: Sep. 28, 2023

(65) Prior Publication Data
US 2025/0193065 A1    Jun. 12, 2025

(51) Int. Cl.
*H04L 27/26*        (2006.01)
*H04L 5/00*         (2006.01)
*H04W 64/00*        (2009.01)

(52) U.S. Cl.
CPC ........ *H04L 27/2639* (2013.01); *H04L 5/0048* (2013.01); *H04W 64/006* (2013.01)

(58) Field of Classification Search
CPC ............. H04L 27/2639; H04L 5/0048; H04W 64/006; H04W 16/26; H04W 16/28; H04W 64/00
See application file for complete search history.

(56) References Cited

U.S. PATENT DOCUMENTS 10,667,148 B1 *    5/2020    Rakib ................... H04L 5/0023
2018/0205481 A1 *  7/2018    Shlomo .............. H04L 27/2639
(Continued)

FOREIGN PATENT DOCUMENTS

JP    2017-528040 A    9/2017
JP    2018-107810 A    7/2018
(Continued)

OTHER PUBLICATIONS

International Search Report for PCT Application No. PCT/JP2022/013724, mailed on Jun. 14, 2022.
(Continued)

*Primary Examiner* — Chieh M Fan
(74) *Attorney, Agent, or Firm* — Sughrue Mion, PLLC

(57)        ABSTRACT

A communication control apparatus according to the present disclosure includes: a control means for selecting a predetermined wireless communication apparatus closest to a terminal from among a plurality of wireless communication apparatuses based on a position of the terminal and positions of the plurality of wireless communication apparatuses, identifying an estimated position of the terminal when a data signal is to be transmitted from the predetermined wireless communication apparatus based on the position and a velocity vector of the terminal when a reference signal (RS) is received by the predetermined wireless communication apparatus, and controlling the predetermined wireless communication apparatus to transmit the data signal with antenna directivity being oriented in a direction from the predetermined wireless communication apparatus toward the estimated position of the terminal.

11 Claims, 8 Drawing Sheets

(56)                          References Cited

U.S. PATENT DOCUMENTS

| | | | |
|---|---|---|---|
| 2022/0030441 A1 | 1/2022 | Balasubramanian et al. | |
| 2023/0327827 A1* | 10/2023 | Patchava ............... | H04L 5/0046 |
| | | | 370/329 |
| 2024/0348295 A1* | 10/2024 | Chen .................... | H04B 7/0854 |
| 2025/0271538 A1* | 8/2025 | Wang ...................... | G01S 13/86 |
| 2025/0310167 A1* | 10/2025 | Suresh ................. | G01S 13/878 |

FOREIGN PATENT DOCUMENTS

| | | |
|---|---|---|
| JP | 2021-002846 A | 1/2021 |
| JP | 2021-136657 A | 9/2021 |

OTHER PUBLICATIONS

R. Hadani et al., "Orthogonal Time Frequency Space Modulation", 2017 IEEE Wireless Communications and Networking Conference (WCNC), 2017.

* cited by examiner

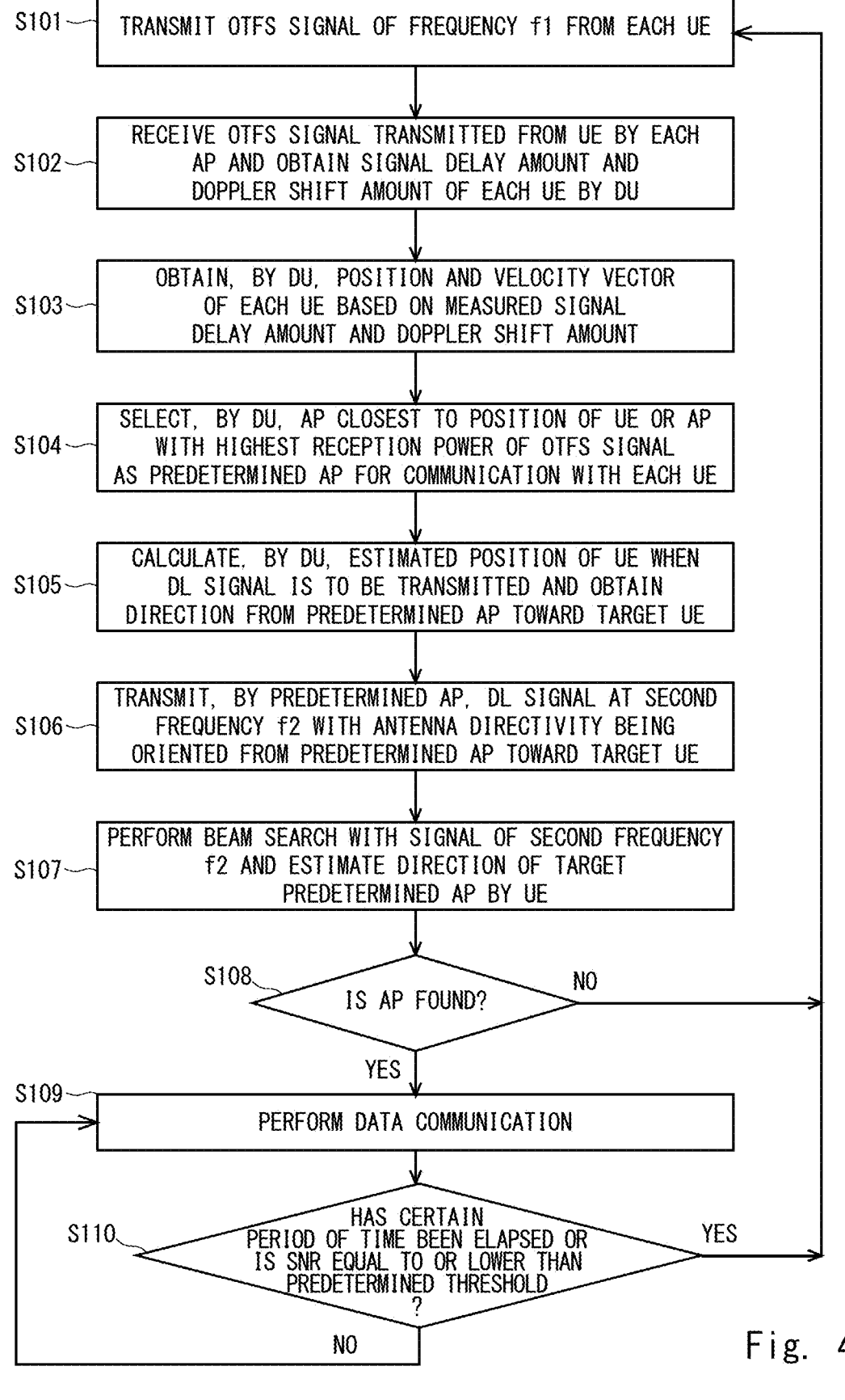

S101 — TRANSMIT OTFS SIGNAL OF FREQUENCY f1 FROM EACH UE

S102 — RECEIVE OTFS SIGNAL TRANSMITTED FROM UE BY EACH AP AND OBTAIN SIGNAL DELAY AMOUNT AND DOPPLER SHIFT AMOUNT OF EACH UE BY DU

S103 — OBTAIN, BY DU, POSITION AND VELOCITY VECTOR OF EACH UE BASED ON MEASURED SIGNAL DELAY AMOUNT AND DOPPLER SHIFT AMOUNT

S104 — SELECT, BY DU, AP CLOSEST TO POSITION OF UE OR AP WITH HIGHEST RECEPTION POWER OF OTFS SIGNAL AS PREDETERMINED AP FOR COMMUNICATION WITH EACH UE

S105 — CALCULATE, BY DU, ESTIMATED POSITION OF UE WHEN DL SIGNAL IS TO BE TRANSMITTED AND OBTAIN DIRECTION FROM PREDETERMINED AP TOWARD TARGET UE

S106 — TRANSMIT, BY PREDETERMINED AP, DL SIGNAL AT SECOND FREQUENCY f2 WITH ANTENNA DIRECTIVITY BEING ORIENTED FROM PREDETERMINED AP TOWARD TARGET UE

S107 — PERFORM BEAM SEARCH WITH SIGNAL OF SECOND FREQUENCY f2 AND ESTIMATE DIRECTION OF TARGET PREDETERMINED AP BY UE

S108 — IS AP FOUND?    NO

YES

S109 — PERFORM DATA COMMUNICATION

S110 — HAS CERTAIN PERIOD OF TIME BEEN ELAPSED OR IS SNR EQUAL TO OR LOWER THAN PREDETERMINED THRESHOLD ?    YES

COMMUNICATION CONTROL APPARATUS, COMMUNICATION SYSTEM, AND METHOD

This application is a National Stage Entry of PCT/JP2022/013724 filed on Mar. 23, 2022, the contents of all of which are incorporated herein by reference, in their entirety.

TECHNICAL FIELD

The present disclosure relates to a communication control apparatus, a communication system, a method, and a non-transitory computer-readable medium, and more particularly, to a communication control apparatus, a communication system, a method, and a non-transitory computer-readable medium that are capable of spatially multiplexing data signals to user equipment and increasing an overall amount of communication to improve communication quality.

BACKGROUND ART

It has been studied to use a millimeter-wave or sub-terahertz (THz) frequency band as a frequency band used in fifth generation (5G) and sixth generation (6G) mobile communications. In the millimeter wave or sub-THz frequency band, a rectilinear propagation property of a signal is high, and attenuation with respect to a propagation distance is great, and thus, communication is sometimes performed by improving an antenna gain using the antenna beamforming technology. In order to perform beamforming, it is necessary to obtain a direction and a propagation channel to user equipment (UE) that is a communication target by actually performing communication using a radio wave.

In paragraph 0047 of Patent Literature 1, it is described that "It will be both time delayed and Doppler frequency shifted relative to the direct wireless OTFS waveform bursts. Thus, these time delayed and Doppler frequency shifted waveforms will be termed "time delayed and Doppler frequency shifted reflected wireless OTFS waveform bursts" when they are received at the wireless receiver. Note also that due to the relative locations and velocities of the transmitter and the receiver, even the direct waveforms may be time delayed and frequency shifted as well."

In paragraph 0060 of Patent Literature 2, it is described that "At step 1102, the UE determines a first set of beamforming directions for communication with a BS in a first network. In an aspect, the first network may be an LTE network using carriers having frequencies below 6.0 GHZ."

CITATION LIST

Patent Literature

Patent Literature 1: Japanese Unexamined Patent Application Publication No. 2021-002846
Patent Literature 2: Japanese Unexamined Patent Application Publication No. 2018-107810

Non Patent Literature

Non Patent Literature 1: R. Hadani et al., "Orthogonal Time Frequency Space Modulation," 2017 IEEE Wireless Communications and Networking Conference (WCNC), 2017, pp. 1-6.

SUMMARY OF INVENTION

Technical Problem

As described above, it is necessary to obtain the direction and the propagation channel to the UE that is the communication target by actually performing communication using the radio wave in order to perform the beamforming. However, since the radio wave is hard to reach in the millimeter wave or sub-THz frequency band, there is a problem that it is difficult to determine a beam direction.

In addition, in the 5G and the 6G, access points (APs) may be installed such that communication ranges (cells) overlap in order to increase communication capacity and eliminate a radio-wave dead zone. There is a case where these APs operate independently, and a plurality of APs transmit signals to one UE simultaneously. If phases of the signals from the plurality of APs can be controlled and can be coherently combined at a position of the UE, deterioration in communication quality due to interference can be prevented. However, a wavelength in the millimeter wave or sub-THz frequency band is short, and a phase changes even with a very slight variation in the position of the UE, and it is difficult to coherently combine the signals. Therefore, there is a problem that the signals from the plurality of APs interfere with each other so that the communication quality is deteriorated.

Therefore, in order to search for a direction of a communication target, the communication target may be searched for by forming a pencil beam and sweeping a direction of the beam in all directions. This is called beam search. Since the amount of propagation attenuation is large in the millimeter wave or sub-THz frequency band, the antenna gain may be increased by increasing the number of antenna elements or the like. However, when the antenna gain is increased, the directivity of a radio wave becomes strong, and an angle range where the radio wave can be detected becomes narrow. Therefore, it is necessary to finely change a beam angle in the beam search, and there is a problem that the time required to search for the communication target increases.

In addition, there is a case where both an AP and UE use the beamforming technology. The AP obtains a direction of the UE by the beam search, and the UE obtains a direction of the AP by the beam search. However, due to the directivity of the radio wave, communication can be performed only when both a beam direction of the AP and a beam direction of the UE coincide with each other, and the mutual directions cannot be detected. In order to detect the mutual directions, for example, there is a method of repeatedly performing the beam search in all directions by the UE each time the beam direction of the AP is changed, and obtaining the direction of the AP from the UE and the direction of the UE from the AP. In this method, the number of trials until the mutual directions are detected increases, and a long time is required for the beam search. Since the beam search is generally performed by sweeping a beam at a maximum output in all directions, a lot of time and power are consumed. Moreover, it is necessary to perform the beam search frequently in order to deal with the movement of the UE or the like, and the power consumption increases along with the above-described prolongation of the beam search. Further, since data communication cannot be performed during the beam search, there is a problem that an overall amount of communication is reduced.

An object of the present disclosure is to provide a communication control apparatus, a communication system, a method, and a non-transitory computer-readable medium that solve any of the above-described problems.

Solution to Problem

A communication control apparatus according to the present disclosure includes:

a first estimation means for estimating, for each of a plurality of wireless communication apparatuses, a signal delay amount from a terminal to an antenna of the wireless communication apparatus and a relative velocity between the terminal and the wireless communication apparatus based on a reference signal, which has been subjected to orthogonal time frequency space modulation, received from the terminal by each of the plurality of wireless communication apparatuses:

a second estimation means for estimating a position and a velocity vector of the terminal based on positions of the plurality of wireless communication apparatuses, and the signal delay amount and the relative velocity estimated for each of the plurality of wireless communication apparatuses; and a control means for selecting a predetermined wireless communication apparatus closest to the terminal from among the plurality of wireless communication apparatuses based on the position of the terminal and the positions of the plurality of wireless communication apparatuses, identifying an estimated position of the terminal when a data signal is to be transmitted from the predetermined wireless communication apparatus based on the position and the velocity vector of the terminal when the reference signal is received by the predetermined wireless communication apparatus, and controlling the predetermined wireless communication apparatus to transmit the data signal with directivity of the antenna being oriented in a direction from the predetermined wireless communication apparatus toward the estimated position of the terminal, wherein a first frequency is used for a signal from the terminal to the wireless communication apparatus, and a second frequency, which is higher in frequency than the first frequency, is used for a signal from the wireless communication apparatus to the terminal.

A communication system according to the present disclosure includes:

a plurality of wireless communication apparatuses that communicate with a terminal; and a communication control apparatus that controls the plurality of wireless communication apparatuses, wherein each of the plurality of wireless communication apparatuses includes:

a reception means for receiving a reference signal, which has been subjected to orthogonal time frequency space modulation, transmitted from the terminal via an antenna; and a transmission means for transmitting a data signal with directivity of the antenna under control from the communication control apparatus, the communication control apparatus includes:

a first estimation means for estimating, for each of the plurality of wireless communication apparatuses, a signal delay amount from the terminal to the antenna and a relative velocity between the terminal and the wireless communication apparatus based on the reference signal received from the terminal by each of the plurality of wireless communication apparatuses;

4 a second estimation means for estimating a position and a velocity vector of the terminal based on positions of the plurality of wireless communication apparatuses, and the signal delay amount and the relative velocity estimated for each of the plurality of wireless communication apparatuses; and a control means for selecting a predetermined wireless communication apparatus closest to the terminal from among the plurality of wireless communication apparatuses based on the position of the terminal and the positions of the plurality of wireless communication apparatuses, identifying an estimated position of the terminal when a data signal is to be transmitted from the predetermined wireless communication apparatus based on the position and the velocity vector of the terminal when the reference signal is received by the predetermined wireless communication apparatus, and controlling the predetermined wireless communication apparatus to transmit the data signal with the directivity of the antenna being oriented in a direction from the predetermined wireless communication apparatus toward the estimated position of the terminal, a first frequency is used for a signal from the terminal to the wireless communication apparatus, and a second frequency, which is higher in frequency than the first frequency, is used for a signal from the wireless communication apparatus to the terminal.

A method according to the present disclosure includes:

estimating, for each of a plurality of wireless communication apparatuses, a signal delay amount from a terminal to an antenna of the wireless communication apparatus and a relative velocity between the terminal and the wireless communication apparatus based on a reference signal, which has been subjected to orthogonal time frequency space modulation, received from the terminal by each of the plurality of wireless communication apparatuses;

estimating a position and a velocity vector of the terminal based on positions of the plurality of wireless communication apparatuses, and the signal delay amount and the relative velocity estimated for each of the plurality of wireless communication apparatuses;

selecting a predetermined wireless communication apparatus closest to the terminal from among the plurality of wireless communication apparatuses based on the position of the terminal and the positions of the plurality of wireless communication apparatuses;

identifying an estimated position of the terminal when a data signal is to be transmitted from the predetermined wireless communication apparatus based on the position and the velocity vector of the terminal when the reference signal is received by the predetermined wireless communication apparatus; and controlling the predetermined wireless communication apparatus to transmit the data signal with directivity of the antenna being oriented in a direction from the predetermined wireless communication apparatus toward the estimated position of the terminal, wherein a first frequency is used for a signal from the terminal to the wireless communication apparatus, and a second frequency, which is higher in frequency than the first frequency, is used for a signal from the wireless communication apparatus to the terminal.

A non-transitory computer-readable medium according to the present disclosure storing a program for causing a computer to execute:

estimating, for each of a plurality of wireless communication apparatuses, a signal delay amount from a terminal to an antenna of the wireless communication apparatus and a relative velocity between the terminal and the wireless communication apparatus based on a reference signal, which has been subjected to orthogonal time frequency space modulation, received from the terminal by each of the plurality of wireless communication apparatuses;

estimating a position and a velocity vector of the terminal based on positions of the plurality of wireless communication apparatuses, and the signal delay amount and the relative velocity estimated for each of the plurality of wireless communication apparatuses;

selecting a predetermined wireless communication apparatus closest to the terminal from among the plurality of wireless communication apparatuses based on the position of the terminal and the positions of the plurality of wireless communication apparatuses;

identifying an estimated position of the terminal when a data signal is to be transmitted from the predetermined wireless communication apparatus based on the position and the velocity vector of the terminal when the reference signal is received by the predetermined wireless communication apparatus; and controlling the predetermined wireless communication apparatus to transmit the data signal with directivity of the antenna being oriented in a direction from the predetermined wireless communication apparatus toward the estimated position of the terminal, wherein a first frequency is used for a signal from the terminal to the wireless communication apparatus, and a second frequency, which is higher in frequency than the first frequency, is used for a signal from the wireless communication apparatus to the terminal.

Advantageous Effects of Invention

According to the present disclosure, it is possible to provide the communication control apparatus, the communication system, the method, and the non-transitory computer-readable medium that are capable of spatially multiplexing data signals to user equipment and increasing an overall amount of communication to improve communication quality.

BRIEF DESCRIPTION OF DRAWINGS

FIG. 4 is a flowchart illustrating an operation of the communication system according to the second example embodiment.

EXAMPLE EMBODIMENT

Figure 1:
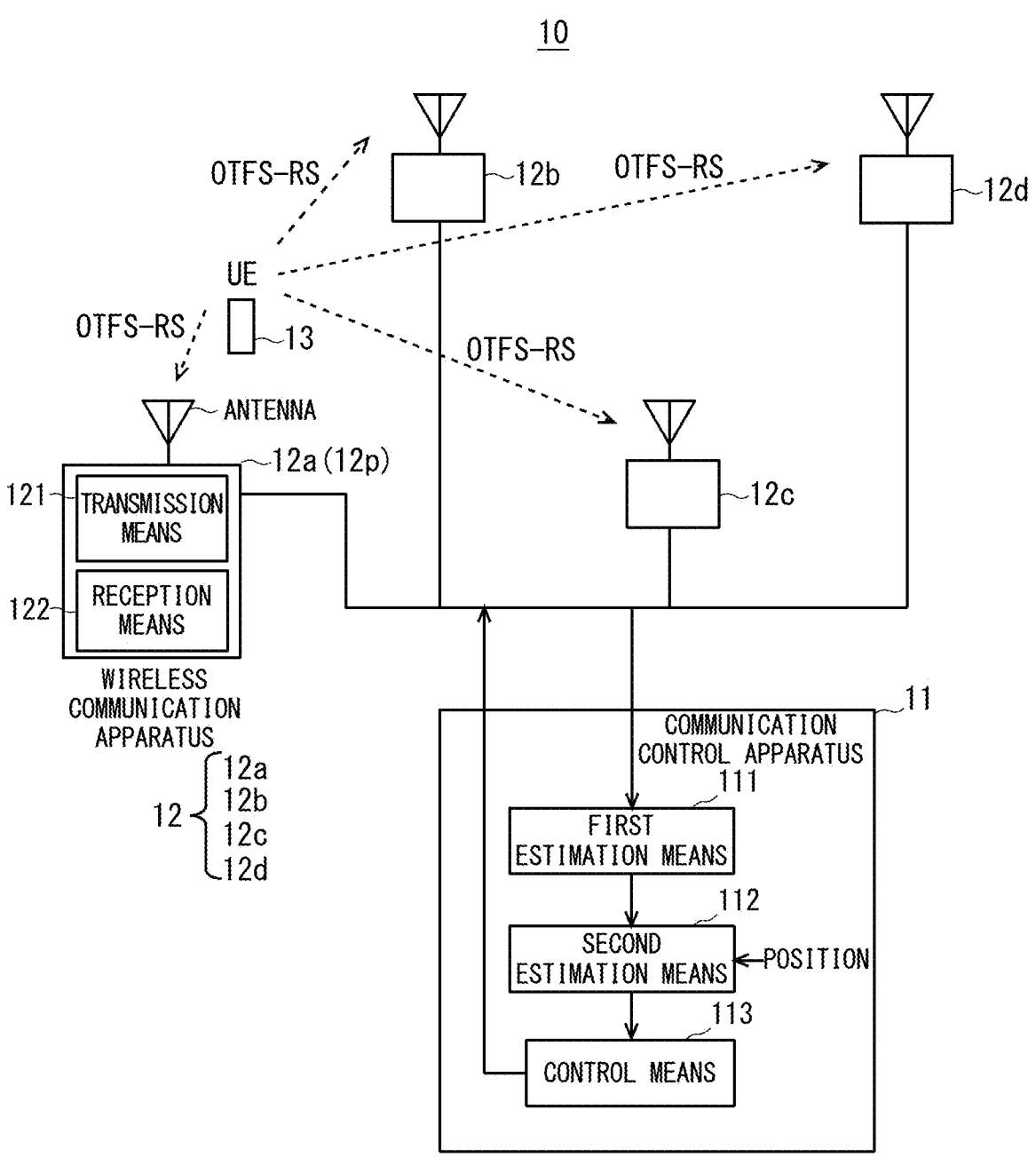
FIG. 1 is a block diagram illustrating a communication system including a communication control apparatus according to a first example embodiment.

Example embodiments of the present disclosure will be described below with reference to the drawings. In the drawings, the same or corresponding elements are denoted by the same reference signs and redundant description will be omitted if necessary for clarity of description.

First Example Embodiment

<Minimum Configuration>

FIG. 1 is a block diagram illustrating a communication system including a communication control apparatus according to a first example embodiment.

FIG. 1 illustrates a minimum configuration of the communication control apparatus according to the first example embodiment.

Recently, there is proposed an orthogonal time frequency space (OTFS) modulation scheme. Details are described in Non Patent Literature 1. Orthogonal frequency division multiplexing (OFDM) arranges data in a time-frequency space, whereas the OTFS arranges data in a delay-Doppler space. Therefore, a position of a transmission source of an OTFS signal can be estimated based on a signal delay amount and a Doppler shift amount. A distance from the transmission source to a reception source of the signal can be estimated from the signal delay amount. In addition, a velocity in a vector direction connecting the transmission source and the reception source of the signal can be estimated from the Doppler shift amount. The technology of the present disclosure utilizes OTFS signal characteristics.

As illustrated in FIG. 1, a communication system 10 according to the first example embodiment includes a terminal 13, a plurality of wireless communication apparatuses 12 that communicate with the terminal 13, and a communication control apparatus 11 that controls the plurality of wireless communication apparatuses 12. Note that the terminal may also be referred to as user equipment (UE). In addition, only one UE is illustrated in FIG. 1, but the present invention is not limited thereto. In addition, only four wireless communication apparatuses are illustrated in FIG. 1, but the present invention is not limited thereto.

Each of the plurality of wireless communication apparatuses 12 includes a reception means 122 and a transmission means 121. The reception means 122 receives an OTFS modulated reference signal (RS) transmitted by the UE 13 via an antenna. The transmission means 121 transmits a data signal with directivity of the antenna being oriented in a direction from the wireless communication apparatus 12 toward the UE 13 under control from the communication control apparatus 11. The orthogonal time frequency space modulated reference signal may also be referred to as an OTFS-RS.

As the reference signal, an impulse signal or a signal close thereto may be used. As a result, a channel impulse response (CIR) including information on a radio wave propagation path can be acquired.

The communication control apparatus 11 includes a first estimation means 111, a second estimation means 112, and a control means 113.

The first estimation means 111 estimates a signal delay amount from the UE 13 to the antenna of the wireless communication apparatus 12 and a Doppler shift amount between the UE 13 and the wireless communication apparatus 12 for each of the plurality of wireless communication apparatuses 12 based on the reference signal received from the UE 13 by each of the plurality of wireless communication apparatuses 12. A distance from the UE 13 to the wireless communication apparatus 12 can be estimated from the signal delay amount. In addition, a velocity in a vector direction connecting the UE 13 and the wireless communication apparatus 12 can be estimated from the Doppler shift amount. The Doppler shift amount is referred to as a relative velocity.

The second estimation means 112 estimates a position and a velocity vector of the UE 13 based on positions of the plurality of wireless communication apparatuses 12, and the signal delay amount and the relative velocity estimated for each of the plurality of wireless communication apparatuses 12. Specifically, the second estimation means 112 estimates the position of the UE 13 based on the positions of the plurality of wireless communication apparatuses 12 and the distances to the UE 13 of the plurality of wireless communication apparatuses 12. In addition, regarding the velocity in the vector direction connecting the UE 13 and the wireless communication apparatus 12, the second estimation means 112 combines the velocities in the vector directions of all the wireless communication apparatuses 12 to estimate the velocity vector of the UE 13.

The control means 113 selects a predetermined wireless communication apparatus 12p closest to the UE 13 from among the plurality of wireless communication apparatuses 12 based on the position of the UE 13 and the positions of the plurality of wireless communication apparatuses 12. The control means 113 identifies an estimated position of the UE 13 when a data signal is to be transmitted from the predetermined wireless communication apparatus 12p based on a position and a velocity vector of the UE 13 when the reference signal to the predetermined wireless communication apparatus 12p is received. The control means 113 controls the predetermined wireless communication apparatus 12p so as to transmit the data signal with directivity of an antenna being oriented in a direction from the predetermined wireless communication apparatus 12p toward the estimated position of the UE 13.

Note that a first frequency f1 is used for a signal from the UE 13 to the wireless communication apparatus 12. In addition, a second frequency f2, which is higher in frequency than the first frequency f1, is used for a signal from the wireless communication apparatus 12 to the UE 13. The signal transmitted from the UE 13 to the wireless communication apparatus 12 may also be referred to as an uplink (UL) signal, and the signal transmitted from the wireless communication apparatus 12 to the UE 13 may also be referred to as a down link (DL) signal.

<Effects>

The communication system 10 according to the example embodiment transmits the data signal with the directivity of the antenna of the predetermined wireless communication apparatus 12p, closest to the UE 13 set as a target, being oriented in the direction from the predetermined wireless communication apparatus 12p toward the estimated position of the UE 13. As a result, the directivity of the antenna of the predetermined wireless communication apparatus 12p can be narrowed down to the target UE, and interference with other UEs is reduced, so that data signals can be spatially multiplexed. In addition, since the interference with other UEs is reduced, the amount of communication can be increased to improve communication quality.

As a result, according to the first example embodiment, it is possible to provide the communication control apparatus, the communication system, a method, and a non-transitory computer-readable medium that are capable of spatially multiplexing data signals to user equipment and increasing an overall amount of communication to improve the communication quality.

Note that, according to the first example embodiment, the wireless communication apparatus 12 that transmits the DL signal can be limited to only the optimum predetermined wireless communication apparatus 12p, and thus, unnecessary transmission of the DL signal can be omitted, and power efficiency per amount of communication can be improved.

In addition, instead of selecting the predetermined wireless communication apparatus 12p closest to the UE 13 based on the position of the UE 13 and the positions of the plurality of wireless communication apparatuses 12, the control means 113 may select a wireless communication apparatus that has received the reference signal with the highest reception power as the predetermined wireless communication apparatus 12p.

Second Example Embodiment

<Overview>

Figure 2:
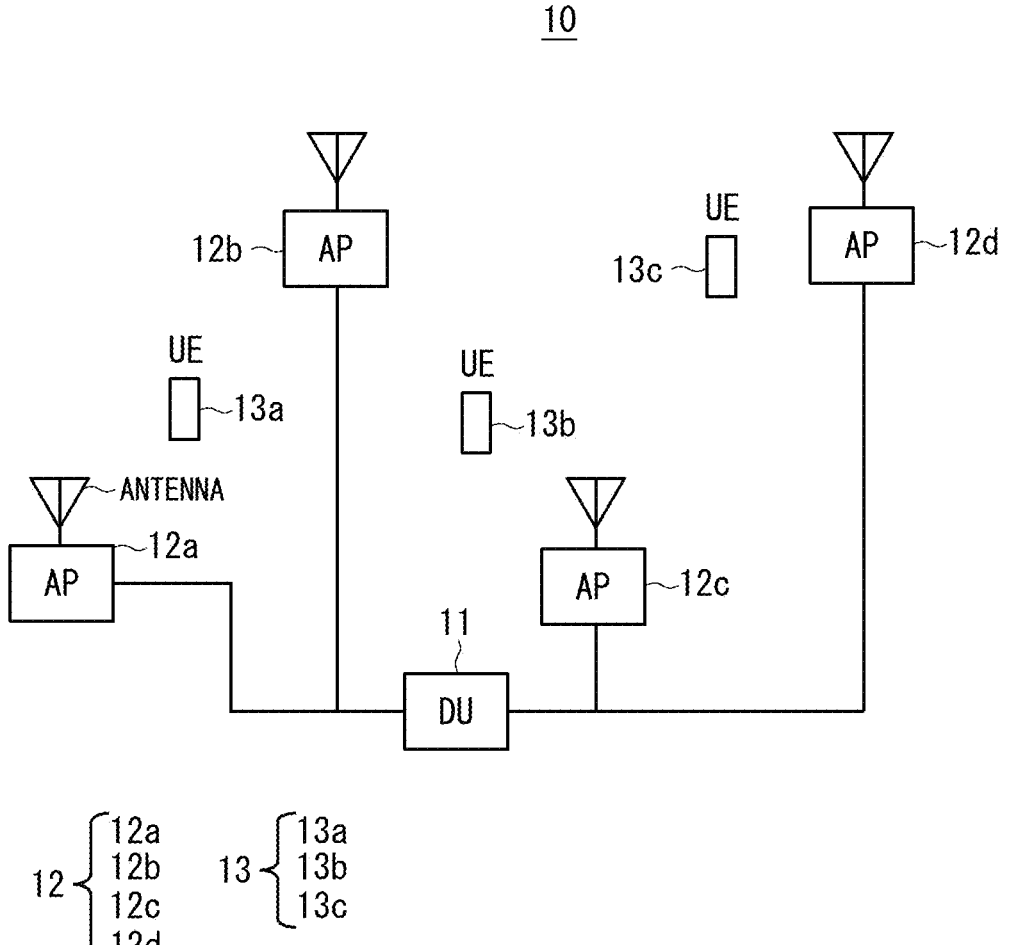
FIG. 2 is a block diagram illustrating a communication system according to a second example embodiment.

FIG. 2 is a block diagram illustrating a communication system according to a second example embodiment.

FIG. 2 is a diagram illustrating a plurality of access points (APs) arranged in a distributed manner and a plurality of UEs existing in an access range of these APs.

FIG. 2 illustrates only three UEs as the UEs 13 within a communication range of the plurality of APs 12, but the present invention is not limited thereto. In addition, only four APs are illustrated in FIG. 2, but the present invention is not limited thereto.

In the second example embodiment, the wireless communication apparatus and the communication control apparatus according to the first example embodiment are indicated as the AP and a distributed unit (DU), respectively. That is, the AP in FIG. 2 corresponds to the wireless communication apparatus in FIG. 1, and the distributed unit (DU) in FIG. 2 corresponds to the communication control apparatus in FIG. 1.

Each of the plurality of APs 12 is connected to one DU 11, and the plurality of APs 12 operates in cooperation with the DU 11.

It is assumed that both the AP 12 and the UE 13 support both the first frequency f1 and the second frequency f2. The first frequency f1 is lower in frequency than the second frequency f2. The first frequency f1 is used in a UL, and a UL signal is subjected to OTFS modulation. The second frequency f2 is used in a DL, and a DL signal is subjected to single carrier modulation.

The AP 12 and the UE 13 switch DL/UL communication by time division duplex (TDD). That is, a UL time zone in which the UL signal is communicated and a DL time zone in which the DL signal is communicated are alternately switched. However, the second example embodiment is not limited only to the TDD. The second example embodiment is also applicable to frequency division duplex (FDD).

When both the AP 12 and the UE 13 use the first frequency f1, an omni-directional antenna or an equivalent antenna with low directivity is used. When both the AP 12 and the UE 13 use the second frequency f2, beamforming is performed with an antenna having a plurality of antenna elements. That is, each antenna of the AP 12 and the UE includes a plurality of antenna elements, and each of the plurality of antenna elements is weighted to be beamformed (to form the directivity). As a result, a high antenna gain can be set to a direction in which the UE 13 exists so that the communication quality with the UE 13 can be improved. Note that the antenna element may also be referred to as an antenna device.

The second example embodiment is particularly effective in a communication system in which stable communication can be performed by using the first frequency f1 in the UL communication, but communication cannot be performed unless the second frequency f2 is used in the DL communication and the directivity (beam) of the antenna is oriented toward the UE 13.

Note that the first frequency f1 may be, for example, a frequency within a frequency band of FR1 (450 megahertz (MHz) to 6 gigahertz (GHz)) in the third generation partnership project (3GPP). In addition, the second frequency f2 may be, for example, a frequency within a frequency band of FR2 (24.25 GHz to 52.6 GHz) in the 3GPP or more sub THz. However, the example embodiment is not limited to these frequency bands.

<Detailed Configuration>

Figure 3:
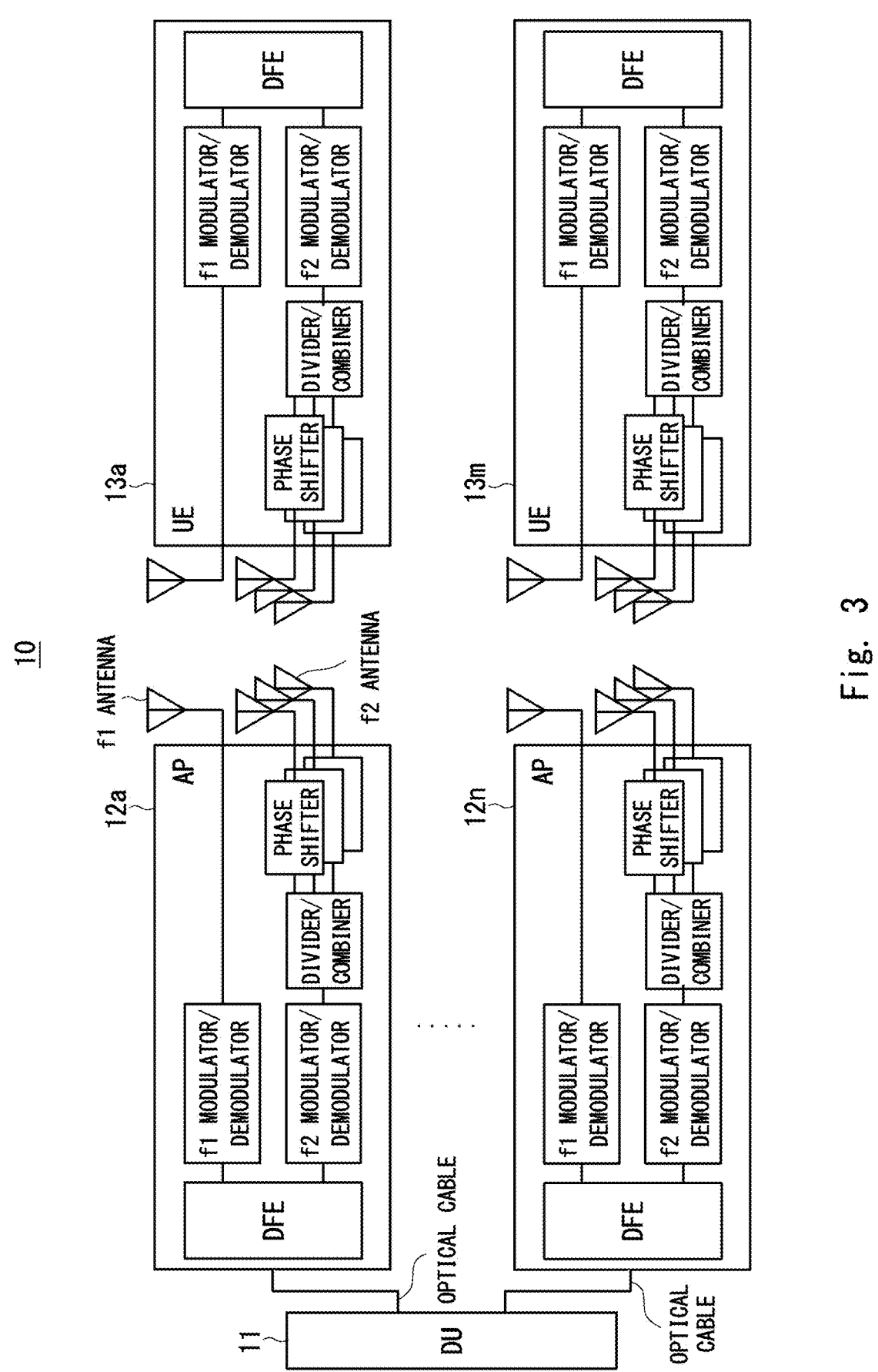
FIG. 3 is a block diagram illustrating the communication system according to the second example embodiment.

FIG. 3 is a block diagram illustrating the communication system according to the second example embodiment.

<AP>

As illustrated in FIG. 3, the DU 11 and the plurality of APs 12 are connected by optical cables. The AP 12 includes a digital front end (DFE), an f1 modulator/demodulator, an f2 modulator/demodulator, a divider, a phase shifter, an f1 antenna, and an f2 antenna. The f1 modulator/demodulator and a reception portion of the DFE illustrated in FIG. 3 correspond to the reception means 122 illustrated in FIG. 1. In addition, a transmission portion of the DFE, the f2 modulator/demodulator, a divider/combiner, and the phase shifter illustrated in FIG. 3 correspond to the transmission means 121 illustrated in FIG. 1.

The f1 antenna receives an RF signal of the first frequency f1. The f1 modulator/demodulator converts a baseband signal and the RF signal of the first frequency f1. The DFE performs digital-to-analog signal conversion. The f2 modulator/demodulator converts the baseband signal and an RF signal of the second frequency f2. The divider/combiner divides the RF signal of the second frequency f2. The phase shifter performs phase adjustment on each of the divided RF signals. The f2 antenna radiates the RF signals of the second frequency f2.

The f2 antennas radiates each of the plurality of divided RF signals, and thus, has the same number of antenna elements as the number of RF divisions. The plurality of APs 12 are controlled by the DU 11 and operate in cooperation.

<UE>

Similarly to the AP 12, the UE 13 includes the DFE, an f1 modulator/demodulator, an f2 modulator/demodulator, a divider/combiner, a phase shifter, an f1 antenna, and an f2 antenna.

The DFE performs digital-to-analog signal conversion. The f1 modulator/demodulator converts a baseband signal and the RF signal of the first frequency f1. The f1 antenna radiates the RF signal of the first frequency f1. The f2 antenna receives the RF signals of the second frequency f2. The phase shifter performs phase adjustment on the received RF signals. The divider/combiner combines the RF signals of the second frequency f2. The f2 modulator/demodulator converts the baseband signal and an RF signal of the second frequency f2.

<Operation>

FIG. 4 is a flowchart illustrating an operation of the communication system according to the second example embodiment.

Figure 5:
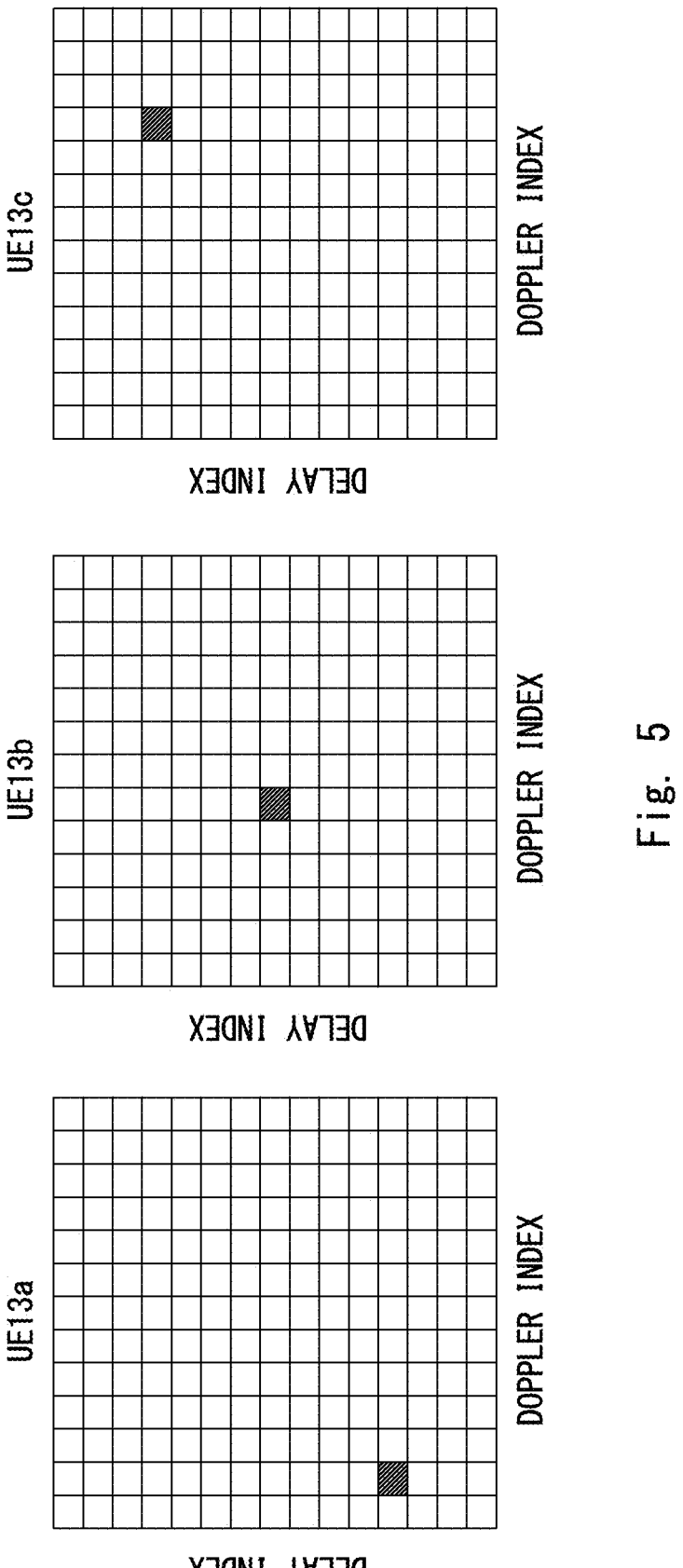
FIG. 5 is a schematic view illustrating an RS in a DD space of an OTFS signal transmitted from UE.

FIG. 5 is a schematic view illustrating an RS in a DD space of an OTFS signal transmitted from UE.

In FIG. 5, the horizontal axis represents a Doppler index, and the vertical axis represents a delay index.

A hatched element illustrated in FIG. 5 indicates an element position of the RS at the time of transmission from the UE 13. In addition, an element illustrated in white indicates an empty element.

As illustrated in FIG. 4, an OTFS modulated reference signal (RS) converted into the RF signal of the first frequency f1 is transmitted from each of the UEs 13 (step S101). Note that the OTFS modulated RS signal may also be referred to as an OTFS signal or an OTFS-RS. The OTFS modulation is a modulation scheme of arranging and modulating a data signal in the DD space. Details of the OTFS modulation are described in Non Patent Literature 1, and detailed description thereof is omitted here.

In the second example embodiment, a case where the OTFS signals are simultaneously transmitted from three UEs 13 (UE 13*a*, UE 13*b*, and UE 13*c* illustrated in FIG. 2) will be described as an example.

After step S101, each of the APs 12 receives the OTFS signals transmitted from the UEs 13, and the DU 11 obtains a signal delay amount and a Doppler shift amount (relative velocity) of each of the UEs 13 (step S102). The signal delay amount and the Doppler shift amount of each of the UEs 13 are transmitted to the DU 11.

As illustrated in FIG. 5, positions of elements of the RS transmitted from the respective UEs 13 are arranged at different element positions in the respective UEs 13 in order to discriminate which UE 13 has transmitted the RS at the AP 12. For example, in the UE 13*a*, the RS is arranged at the element position where the Doppler index is 2 and the delay index is 4.

Figure 6:
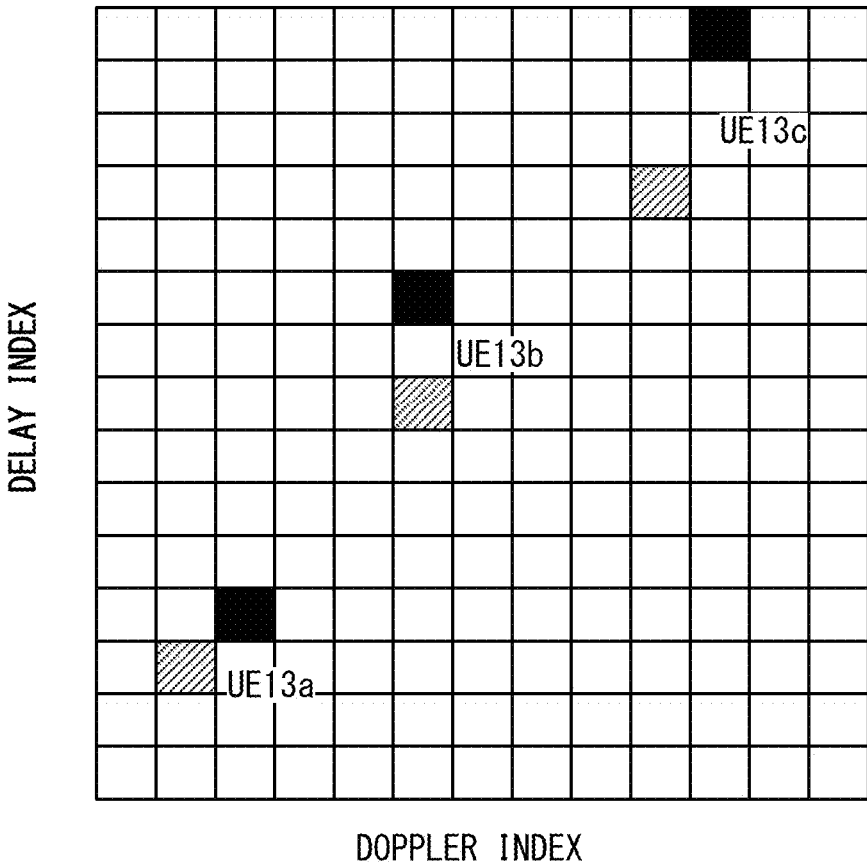
FIG. 6 is a schematic view illustrating the RS in the DD space of the OTFS signal received by an AP.

FIG. 6 is a schematic view illustrating the RS in the DD space of the OTFS signal received by the AP 12*a*.

In FIG. 6, the horizontal axis represents the Doppler index, and the vertical axis represents the delay index.

FIG. 6 illustrates an example in which the OTFS signals transmitted from the three UEs 13 are received and demodulated by the AP.

An element illustrated in black in FIG. 6 indicates an element position of the RS at the time of detection (at the time of reception) by the AP 12*a*. A hatched element indicates an element position of the RS at the time of transmission from the UE 13.

In FIG. 6, as a distance between the AP 12*a* and the UE 13 is longer, the element position (illustrated in black) of the received RS is measured at a position shifted more greatly in the vertical direction (Delay direction) than the element position (indicated by hatching) transmitted by the UE 13. This shift in the delay direction is referred to as a signal delay amount. In addition, as a velocity of the UE 13 relative to the AP 12*a* is faster, the element position (illustrated in black) of the received RS is measured at a position shifted more greatly in the horizontal direction (Doppler direction) than the element position (indicated by hatching) transmitted by the UE 13. The relative velocity is obtained from this shift in the Doppler direction, that is, the Doppler shift amount of the OTFS modulated RS.

Therefore, the signal delay amount and the relative velocity can be obtained based on the shifts of the element positions, that is, the element position (indicated by hatching in FIG. 6) of the RS in the DD space at the time of transmission from the UE 13 and the element position (illustrated in black in FIG. 6) of the RS in the DD space when the RS is received by the AP 12*a*.

Referring back to FIG. 4, after step S102, the DU 11 obtains a distance from each of the APs 12 to each of the UEs 13 and a velocity in a direction connecting each of the APs 12 and each of the UEs 13 based on the signal delay amount and the Doppler shift amount (relative velocity) measured and obtained by each of the plurality of APs 12. The DU 11 estimates a position and a velocity vector of each of the UEs 13 based on the distance and the velocity to the UE 13 when positions of the plurality of APs 12 are known. That is, the DU 11 obtains the position and the velocity vector of each of the UEs 13 based on the measured signal delay amount and Doppler shift amount (step S103).

<Method for Estimating Position and Velocity Vector of UE>

A specific estimation method will be described hereinafter.

Figure 7:
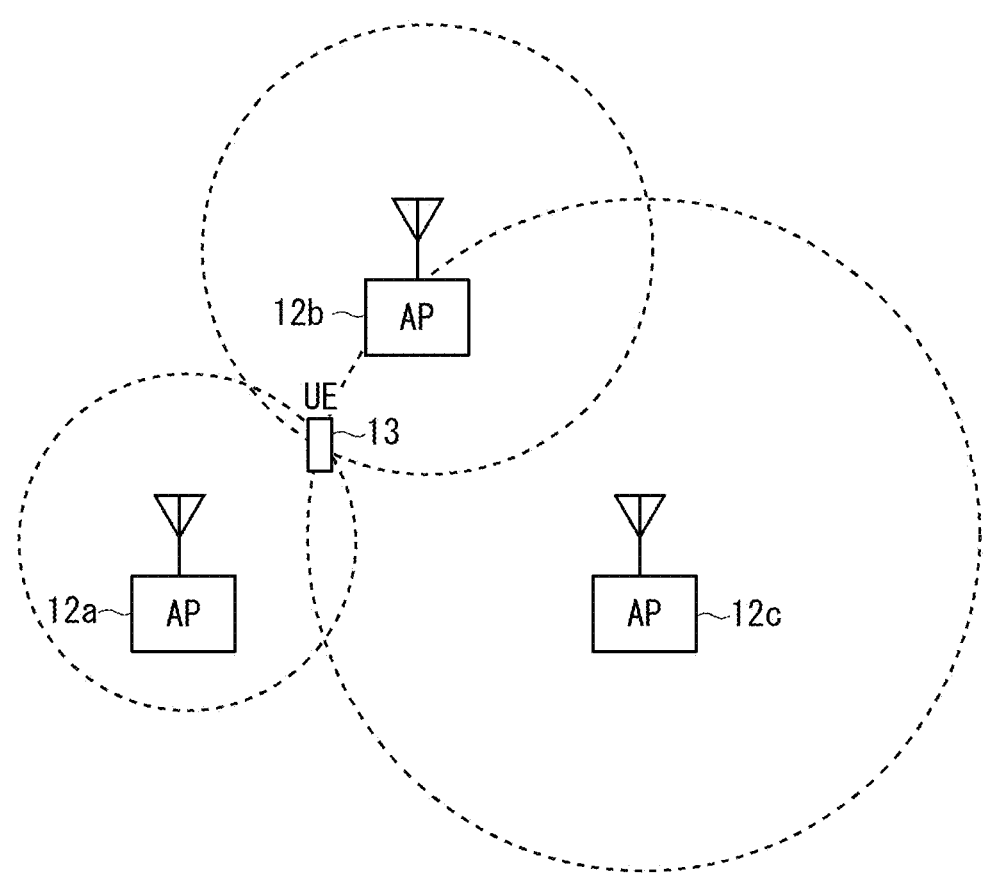
FIG. 7 is a schematic view illustrating a plurality of APs and distances from the respective APs to the UE.

FIG. 7 is a schematic view illustrating a plurality of APs and distances from the respective APs to UE.

FIG. 7 is a view for describing a method for estimating a position of the UE.

A dotted circle in FIG. 7 indicates a distance from each of the APs 12 to the UE 13 measured by each of the APs 12 using the OTFS.

As illustrated in FIG. 7, the position of the UE 13 can be uniquely estimated by obtaining the distances from the respective APs 12 to the UE 13 in three or more APs 12.

Figure 8:
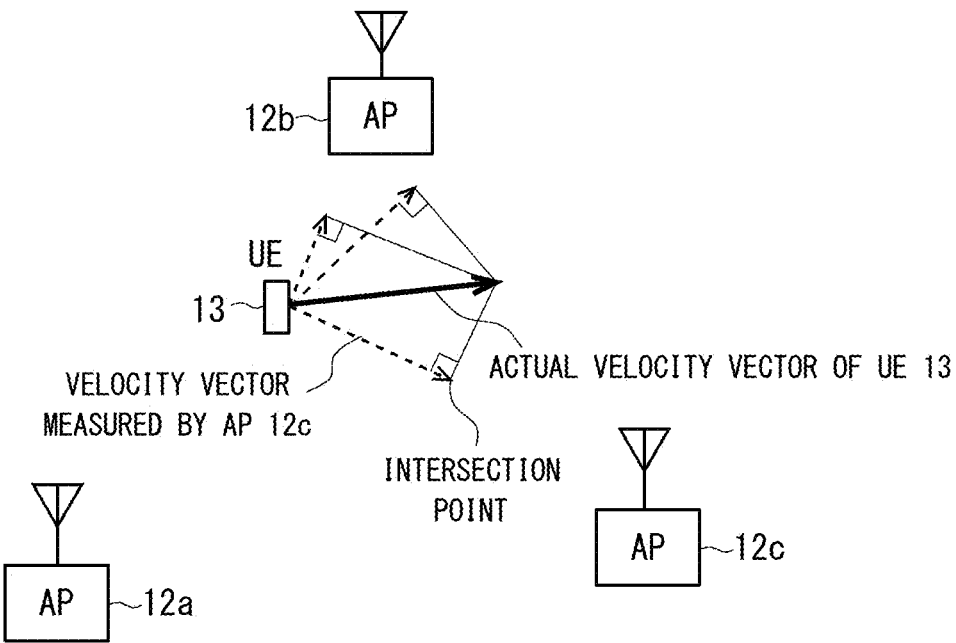
FIG. 8 is a schematic view illustrating a plurality of APs and velocity vectors of the UE corresponding to the respective APs.

FIG. 8 is a schematic view illustrating a plurality of APs and velocity vectors of UE corresponding to the respective APs.

FIG. 8 is a view for describing a method for estimating a velocity vector of the UE.

A dotted arrow in FIG. 8 indicates the velocity vector of the UE for each of the APs measured using the OTFS.

As illustrated in FIG. 8, in three or more APs 12, the velocity vector of the UE 13 can be uniquely estimated by obtaining a velocity in a direction connecting each of the APs 12 and the UE 13. Note that, in FIG. 8, the velocity vector measured by each AP is obtained by projecting an actual velocity vector of the UE 13 in a direction from the UE 13 to the AP 12. From the actual velocity vector of the UE 13, a perpendicular line and an intersection point drawn on a straight line connecting the UE 13 and each of the APs 12 represent the magnitude of the velocity measured by the AP 12. In this manner, the position of the UE 13 and the velocity vector of the UE 13 are estimated.

Returning to FIG. 6, the reception power of the OTFS-RS transmitted from each of the UEs 13 can be obtained by obtaining amplitudes of an element that has detected the OTFS-RS from each of the UEs 13 and elements around the element.

Referring back to FIG. 4, after step S103, the DU 11 selects the AP 12 closest to the estimated position of the UE 13 or the AP 12 with the highest reception power of the OTFS signal as the predetermined AP 12p for communication with each of the UEs 13 (step S104). The reception power of the OTFS-RS received by the AP 12 can be obtained by obtaining the amplitudes of the element that has detected the OTFS-RS from each of the UEs 13 and the elements around the element with reference to FIG. 6.

The DU 11 calculates an estimated position of the UE 13 when the DL signal is transmitted, and obtains a direction from the predetermined AP 12p toward the estimated position of the target UE 13 (step S105).

The AP 12p weights the antenna elements to orient the antenna directivity from the AP 12p toward the target UE 13 and transmits the DL signal at the second frequency f2 (step S106).

The UE 13 performs beam search with a signal of the second frequency f2 and estimates a direction in which the predetermined target AP 12p exists (step S107). For the beam search, a peak search method, a multiple signal classification (MUSIC) method, an estimation of signal parameters via rotational invariance techniques (ESPRIT) method, or the like is used. As a result, beam directions of the AP 12 and the UE 13 are oriented to each other so that communication can be performed in a short time.

In addition, since the beam direction of the AP 12 is oriented to a direction in which the UE 13 exists, the UE 13 can efficiently perform the beam search, and the time required for the beam search can be shortened. As a result, the UE 13 can reduce power required for beam search. In addition, since the UE 13 can use the time required for the beam search for data communication, the amount of communication can be increased.

In a case where the AP 12 is found (Step S108: Yes), the UE 13 orients a beam of the second frequency f2 toward the AP 12 and starts data communication (Step S109).

When the AP 12 is not found (step S108: No), the UE 13 returns to step S101 and repeatedly tries to search for beam directions of the AP 12 and the UE 13.

After the data communication at the second frequency f2 is started, when a certain period of time has elapsed or when a signal to noise ratio (SNR) is equal to or lower than a predetermined threshold (step S110: Yes), the UE 13 returns to step S101 and searches for beam directions of the AP 12 and the UE 13.

<Effects>

In a case where the respective APs 12 do not cooperate with each other and independently transmit signals to all the UEs 13 within a signal coverage range, signals from a plurality of the APs 12 reach one UE 13. Since a frequency in a millimeter wave or sub-THz frequency band is high and coherent combining of phases is difficult, interference occurs in reception signals in the UE 13. The interference causes variation and deterioration in the communication quality.

Therefore, the DL signal is transmitted with the antenna directivity being oriented from the AP 12 toward the UE 13 only from one appropriate AP 12 in the second example embodiment, and thus, the interference can be reduced. As a result, signals of the plurality of UEs 13 can be spatially multiplexed, and the amount of communication of the entire communication system can be increased.

In addition, if DL signals for the plurality of UEs 13 are transmitted from one AP 12, since power that can be transmitted from the AP 13 is constant, and thus, power per UE decreases. Therefore, the reception power of the UE 13 decreases, leading to a decrease in the communication quality.

Therefore, the DL signal is transmitted only from one appropriate AP 12 in the second example embodiment, and thus, transmission power per UE is increased, and the communication quality is improved. In addition, communication with low quality is not performed, and thus, energy efficiency per amount of communication can be improved.

In addition, the position of the UE 13 is estimated by using the OTFS signal of the first frequency f1 in the second example embodiment. Then, the time required for the beam search can be shortened by utilizing the position information of the UE 13 for an angle (directivity) of the beam at the second frequency f2. As a result, it is possible to allocate time to the data communication by such an amount, and thus, it is possible to increase the amount of communication and reduce power consumption.

In addition, the second example embodiment is also applicable to a case where the UE 13 does not perform beamforming at the second frequency f2. In such a case, the processing of step S107 illustrated in FIG. 4 is not performed.

In addition, the second example embodiment is also applicable to a case where the UE 13 does not have an OTFS modulation means (a portion performing an inverse symplectic finite Fourier transform (ISFFT)). An OTFS signal is created by performing OFDM modulation after data arranged in the DD space is modulated into data in the time-frequency space by the ISFFT. Therefore, in the second example embodiment, data, obtained by performing the ISFFT in advance on a reference signal (RS) of the OTFS modulation, is held in the UE 13. This signal is OFDM modulated and transmitted when the delay amount and the relative velocity of the UE 13 are to be obtained, whereby the second example embodiment can be applied to the UE 13 having no OTFS modulation means.

<Features>

In the example embodiments of the present disclosure, the OTFS modulated signal is transmitted from the UE 13 using the first frequency f1 lower in frequency than the second frequency f2. Since the first frequency f1 has less propagation loss than the second frequency f2, the UE 13 can communicate with the AP 12 without generally performing the beam search.

In addition, the channel impulse response (CIR) including information of the radio wave propagation path can be acquired by receiving the OTFS-RS by the plurality of APs 12 in the example embodiments. Moreover, the position and the velocity vector of the UE 13 can be estimated from the CIR. The AP 12 performs antenna weighting for the signal of the second frequency f2 using the acquired CIR, and transmits the DL signal. As a result, a high antenna gain can be set to a direction in which the UE 13 exists so that the communication quality with the UE 13 can be improved.

In the above-described example embodiments, the present disclosure has been described as a hardware configuration, but the present disclosure is not limited thereto. The present disclosure can also implement processing of each component by causing a central processing unit (CPU) to execute a computer program.

In addition, in the above-described example embodiments, the program can be stored using various types of non-transitory computer-readable media and supplied to the computer. The non-transitory computer-readable media include various types of tangible storage media. Examples of the non-transitory computer-readable media include a magnetic recording medium (specifically, a flexible disk, a magnetic tape, or a hard disk drive), a magneto-optical recording medium (specifically, a magneto-optical disk), a CD-read only memory (ROM), a CD-R, a CD-R/W, and a semiconductor memory (specifically, a mask ROM, a programmable ROM (PROM), an erasable PROM (EPROM), a flash ROM, or a random access memory (RAM). In addition, the program may be supplied to the computer by various types of transitory computer-readable media. Examples of the transitory computer-readable media include electric signals, optical signals, and electromagnetic waves. The transitory computer-readable media can provide the program to the computer via a wired communication line such as an electric wire and optical fibers or a wireless communication line.

Moreover, while operations are illustrated in a specific order, this should not be understood as requiring that such operations be performed in the specific order illustrated or in a sequential order, or that all operations illustrated be executed, to achieve desirable results. In a specific situation, multitasking and parallel processing may be advantageous. Similarly, while details of some specific example embodiments are included in the above discussion, these should be construed as descriptions of features specific to the specific example embodiments, rather than as limitations on the scope of the disclosure. Specific features described in the context of separate example embodiments may be implemented in combination in a single example embodiment. Conversely, various features described in the context of a single example embodiment may be implemented in a plurality of example embodiments separately or in any suitable combination.

Although the content of the present disclosure has been described above with reference to the example embodiments, the present disclosure is not limited to the above. Various modifications that could be understood by those skilled in the art can be made to the configuration and details of the present disclosure within the scope of the disclosure.

Note that the present disclosure is not limited to the above-described example embodiments, and can be appropriately changed without departing from the gist.

Some or all of the above-described example embodiments can be described as in the following Supplementary Notes, but are not limited to the following Supplementary Notes.

(Supplementary Note 1)

A communication control apparatus including:

a first estimation means for estimating, for each of a plurality of wireless communication apparatuses, a signal delay amount from a terminal to an antenna of the wireless communication apparatus and a relative velocity between the terminal and the wireless communication apparatus based on a reference signal, which has been subjected to orthogonal time frequency space modulation, received from the terminal by each of the plurality of wireless communication apparatuses;

a second estimation means for estimating a position and a velocity vector of the terminal based on positions of the plurality of wireless communication apparatuses, and the signal delay amount and the relative velocity estimated for each of the plurality of wireless communication apparatuses; and a control means for selecting a predetermined wireless communication apparatus closest to the terminal from among the plurality of wireless communication apparatuses based on the position of the terminal and the positions of the plurality of wireless communication apparatuses, identifying an estimated position of the terminal when a data signal is to be transmitted from the predetermined wireless communication apparatus based on the position and the velocity vector of the terminal when the reference signal is received by the predetermined wireless communication apparatus, and controlling the predetermined wireless communication apparatus to transmit the data signal with directivity of the antenna being oriented in a direction from the predetermined wireless communication apparatus toward the estimated position of the terminal, wherein a first frequency is used for a signal from the terminal to the wireless communication apparatus, and a second frequency, which is higher in frequency than the first frequency, is used for a signal from the wireless communication apparatus to the terminal.

(Supplementary Note 2)

The communication control apparatus according to Supplementary Note 1, wherein the signal delay amount and the relative velocity are estimated based on a position in a delay-Doppler space of the reference signal when being transmitted from the terminal and a position in the delay-Doppler space of the reference signal when being received by the wireless communication apparatus.

(Supplementary Note 3)

The communication control apparatus according to Supplementary Note 1 or 2, wherein the control means selects the wireless communication apparatus that has received the reference signal with highest reception power as the predetermined wireless communication apparatus, instead of selecting the predetermined wireless communication apparatus closest to the terminal based on the position of the terminal and the positions of the plurality of wireless communication apparatuses.

(Supplementary Note 4)

The communication control apparatus according to any one of Supplementary Notes 1 to 3, wherein the relative velocity is obtained from a Doppler shift amount of the reference signal which has been subjected to the orthogonal time frequency space modulation.

(Supplementary Note 5)

The communication control apparatus according to any one of Supplementary Notes 1 to 4, wherein the antenna includes a plurality of antenna elements, and each of the plurality of antenna elements is weighted to form the directivity.

(Supplementary Note 6)

The communication control apparatus according to any one of Supplementary Notes 1 to 5, wherein a downlink signal from the wireless communication apparatus to the terminal is subjected to single carrier modulation.

(Supplementary Note 7)

The communication control apparatus according to Supplementary Note 6, wherein an uplink time zone in which an uplink signal from the terminal to the wireless communication apparatus is communicated and a downlink time zone in which the downlink signal is communicated are alternately switched.

(Supplementary Note 8)

The communication control apparatus according to any one of Supplementary Notes 1 to 7, wherein the own apparatus and the plurality of wireless communication apparatuses are connected by an optical cable.

(Supplementary Note 9)

A communication system including:

a plurality of wireless communication apparatuses that communicate with a terminal; and a communication control apparatus that controls the plurality of wireless communication apparatuses, wherein each of the plurality of wireless communication apparatuses includes:

a reception means for receiving a reference signal, which has been subjected to orthogonal time frequency space modulation, transmitted from the terminal via an antenna; and a transmission means for transmitting a data signal with directivity of the antenna under control from the communication control apparatus, the communication control apparatus includes:

a first estimation means for estimating, for each of the plurality of wireless communication apparatuses, a signal delay amount from the terminal to the antenna and a relative velocity between the terminal and the wireless communication apparatus based on the reference signal received from the terminal by each of the plurality of wireless communication apparatuses;

a second estimation means for estimating a position and a velocity vector of the terminal based on positions of the plurality of wireless communication apparatuses, and the signal delay amount and the relative velocity estimated for each of the plurality of wireless communication apparatuses; and a control means for selecting a predetermined wireless communication apparatus closest to the terminal from among the plurality of wireless communication apparatuses based on the position of the terminal and the positions of the plurality of wireless communication apparatuses, identifying an estimated position of the terminal when a data signal is to be transmitted from the predetermined wireless communication apparatus based on the position and the velocity vector of the terminal when the reference signal is received by the predetermined wireless communication apparatus, and controlling the predetermined wireless communication apparatus to transmit the data signal with the directivity of the antenna being oriented in a direction from the predetermined wireless communication apparatus toward the estimated position of the terminal, a first frequency is used for a signal from the terminal to the wireless communication apparatus, and a second frequency, which is higher in frequency than the first frequency, is used for a signal from the wireless communication apparatus to the terminal.

(Supplementary Note 10)

The communication system according to Supplementary Note 9, wherein the signal delay amount and the relative velocity are estimated based on a position in a delay-Doppler space of the reference signal when being transmitted from the terminal and a position in the delay-Doppler space of the reference signal when being received by the wireless communication apparatus.

(Supplementary Note 11)

A method including:

estimating, for each of a plurality of wireless communication apparatuses, a signal delay amount from a terminal to an antenna of the wireless communication apparatus and a relative velocity between the terminal and the wireless communication apparatus based on a reference signal, which has been subjected to orthogonal time frequency space modulation, received from the terminal by each of the plurality of wireless communication apparatuses;

estimating a position and a velocity vector of the terminal based on positions of the plurality of wireless communication apparatuses, and the signal delay amount and the relative velocity estimated for each of the plurality of wireless communication apparatuses;

selecting a predetermined wireless communication apparatus closest to the terminal from among the plurality of wireless communication apparatuses based on the position of the terminal and the positions of the plurality of wireless communication apparatuses;

identifying an estimated position of the terminal when a data signal is to be transmitted from the predetermined wireless communication apparatus based on the position and the velocity vector of the terminal when the reference signal is received by the predetermined wireless communication apparatus; and controlling the predetermined wireless communication apparatus to transmit the data signal with directivity of the antenna being oriented in a direction from the predetermined wireless communication apparatus toward the estimated position of the terminal, wherein a first frequency is used for a signal from the terminal to the wireless communication apparatus, and a second frequency, which is higher in frequency than the first frequency, is used for a signal from the wireless communication apparatus to the terminal.

(Supplementary Note 12)

A non-transitory computer-readable medium storing a program for causing a computer to execute:

estimating, for each of a plurality of wireless communication apparatuses, a signal delay amount from a terminal to an antenna of the wireless communication apparatus and a relative velocity between the terminal and the wireless communication apparatus based on a reference signal, which has been subjected to orthogonal time frequency space modulation, received from the terminal by each of the plurality of wireless communication apparatuses;

estimating a position and a velocity vector of the terminal based on positions of the plurality of wireless communication apparatuses, and the signal delay amount and the relative velocity estimated for each of the plurality of wireless communication apparatuses;

selecting a predetermined wireless communication apparatus closest to the terminal from among the plurality of wireless communication apparatuses based on the position of the terminal and the positions of the plurality of wireless communication apparatuses;

identifying an estimated position of the terminal when a data signal is to be transmitted from the predetermined wireless communication apparatus based on the position and the velocity vector of the terminal when the reference signal is received by the predetermined wireless communication apparatus; and controlling the predetermined wireless communication apparatus to transmit the data signal with directivity of the antenna being oriented in a direction from the predetermined wireless communication apparatus toward the estimated position of the terminal, wherein a first frequency is used for a signal from the terminal to the wireless communication apparatus, and a second frequency, which is higher in frequency than the first frequency, is used for a signal from the wireless communication apparatus to the terminal.

REFERENCE SIGNS LIST

10 Communication System
11 Communication Control Apparatus, DU
111 First Estimation Means
112 Second Estimation Means
113 Control Means
12, 12a, 12b, 12c, 12d, 12p Wireless Communication Apparatus, Access Point, AP
121 Transmission Means
122 Reception Means
13, 13a, 13b, 13c Terminal, User Equipment, UE
f1 First Frequency
f2 Second Frequency

What is claimed is:

1. A communication control apparatus comprising:
at least one memory storing instructions, and
at least one processor configured to execute the instructions to;
estimate, for each of a plurality of wireless communication apparatuses, a signal delay amount from a terminal to an antenna of the wireless communication apparatus and a relative velocity between the terminal and the wireless communication apparatus based on a reference signal, which has been subjected to orthogonal time frequency space modulation, received from the terminal by each of the plurality of wireless communication apparatuses;

estimate a position and a velocity vector of the terminal based on positions of the plurality of wireless communication apparatuses, and the signal delay amount and the relative velocity estimated for each of the plurality of wireless communication apparatuses; and select a predetermined wireless communication apparatus closest to the terminal from among the plurality of wireless communication apparatuses based on the position of the terminal and the positions of the plurality of wireless communication apparatuses, identifying an estimated position of the terminal when a data signal is to be transmitted from the predetermined wireless communication apparatus based on the position and the velocity vector of the terminal when the reference signal is received by the predetermined wireless communication apparatus, and control the predetermined wireless communication apparatus to transmit the data signal with directivity of the antenna being oriented in a direction from the predetermined wireless communication apparatus toward the estimated position of the terminal, wherein a first frequency is used for a signal from the terminal to the wireless communication apparatus, and a second frequency, which is higher in frequency than the first frequency, is used for a signal from the wireless communication apparatus to the terminal.

2. The communication control apparatus according to claim 1, wherein the signal delay amount and the relative velocity are estimated based on a position in a delay-Doppler space of the reference signal when being transmitted from the terminal and a position in the delay-Doppler space of the reference signal when being received by the wireless communication apparatus.

3. The communication control apparatus according to claim 1, wherein the at least one processor configured to execute the instructions to select the wireless communication apparatus that has received the reference signal with highest reception power as the predetermined wireless communication apparatus, instead of selecting the predetermined wireless communication apparatus closest to the terminal based on the position of the terminal and the positions of the plurality of wireless communication apparatuses.

4. The communication control apparatus according to claim 1, wherein the relative velocity is obtained from a Doppler shift amount of the reference signal which has been subjected to the orthogonal time frequency space modulation.

5. The communication control apparatus according to claim 1, wherein
the antenna includes a plurality of antenna elements, and
each of the plurality of antenna elements is weighted to form the directivity.

6. The communication control apparatus according to claim 1, wherein a downlink signal from the wireless communication apparatus to the terminal is subjected to single carrier modulation.

7. The communication control apparatus according to claim 6, wherein an uplink time zone in which an uplink signal from the terminal to the wireless communication apparatus is communicated and a downlink time zone in which the downlink signal is communicated are alternately switched.

8. The communication control apparatus according to claim 1, wherein the communication control apparatus and the plurality of wireless communication apparatuses are connected by an optical cable.

9. A communication system comprising:

a plurality of wireless communication apparatuses that communicate with a terminal; and a communication control apparatus that controls the plurality of wireless communication apparatuses, wherein each of the plurality of wireless communication apparatuses includes:

at least one wireless memory storing instructions, and at least one wireless processor configured to execute the instructions to;

receive a reference signal, which has been subjected to orthogonal time frequency space modulation, transmitted from the terminal via an antenna; and transmit a data signal with directivity of the antenna under control from the communication control apparatus, the communication control apparatus includes:

at least one control memory storing instructions, and at least one control processor configured to execute the instructions to;

estimate, for each of the plurality of wireless communication apparatuses, a signal delay amount from the terminal to the antenna and a relative velocity between the terminal and the wireless communication apparatus based on the reference signal received from the terminal by each of the plurality of wireless communication apparatuses;

estimate a position and a velocity vector of the terminal based on positions of the plurality of wireless communication apparatuses, and the signal delay amount and the relative velocity estimated for each of the plurality of wireless communication apparatuses; and select a predetermined wireless communication apparatus closest to the terminal from among the plurality of wireless communication apparatuses based on the position of the terminal and the positions of the plurality of wireless communication apparatuses, identifying an estimated position of the terminal when a data signal is to be transmitted from the predetermined wireless communication apparatus based on the position and the velocity vector of the terminal when the reference signal is received by the predetermined wireless communication apparatus, and control the predetermined wireless communication apparatus to transmit the data signal with the directivity of the antenna being oriented in a direction from the predetermined wireless communication apparatus toward the estimated position of the terminal, a first frequency is used for a signal from the terminal to the wireless communication apparatus, and a second frequency, which is higher in frequency than the first frequency, is used for a signal from the wireless communication apparatus to the terminal.

10. The communication system according to claim 9, wherein the signal delay amount and the relative velocity are estimated based on a position in a delay-Doppler space of the reference signal when being transmitted from the terminal and a position in the delay-Doppler space of the reference signal when being received by the wireless communication apparatus.

11. A method comprising:

estimating, for each of a plurality of wireless communication apparatuses, a signal delay amount from a terminal to an antenna of the wireless communication apparatus and a relative velocity between the terminal and the wireless communication apparatus based on a reference signal, which has been subjected to orthogonal time frequency space modulation, received from the terminal by each of the plurality of wireless communication apparatuses;

estimating a position and a velocity vector of the terminal based on positions of the plurality of wireless communication apparatuses, and the signal delay amount and the relative velocity estimated for each of the plurality of wireless communication apparatuses;

selecting a predetermined wireless communication apparatus closest to the terminal from among the plurality of wireless communication apparatuses based on the position of the terminal and the positions of the plurality of wireless communication apparatuses;

identifying an estimated position of the terminal when a data signal is to be transmitted from the predetermined wireless communication apparatus based on the position and the velocity vector of the terminal when the reference signal is received by the predetermined wireless communication apparatus; and controlling the predetermined wireless communication apparatus to transmit the data signal with directivity of the antenna being oriented in a direction from the predetermined wireless communication apparatus toward the estimated position of the terminal, wherein a first frequency is used for a signal from the terminal to the wireless communication apparatus, and a second frequency, which is higher in frequency than the first frequency, is used for a signal from the wireless communication apparatus to the terminal.

* * * * *